May 1, 1928.

J. A. FOLLMAN 1,668,400

POWER LIFT FOR HARROWS

Filed Feb. 5, 1927  4 Sheets-Sheet 1

J. A. Follman
INVENTOR

BY Victor J. Evans
ATTORNEY

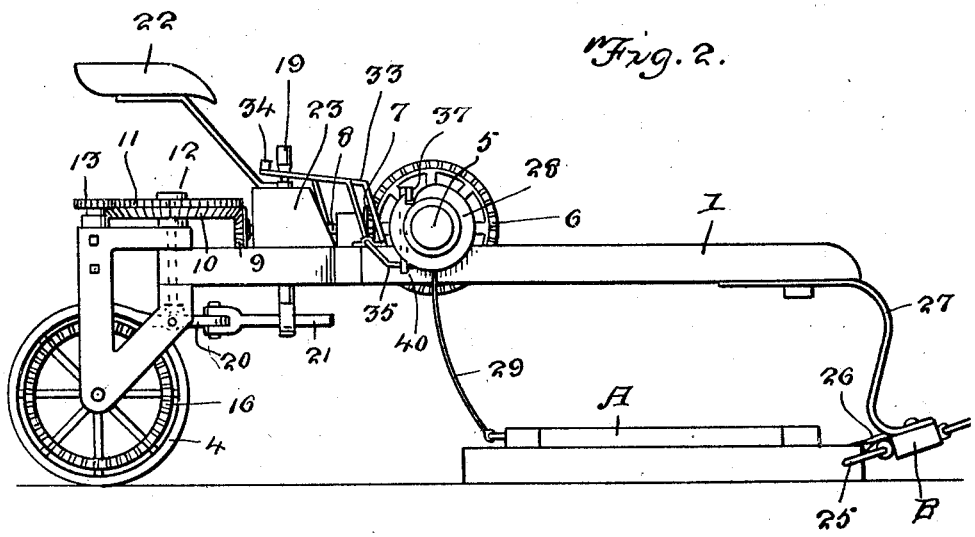
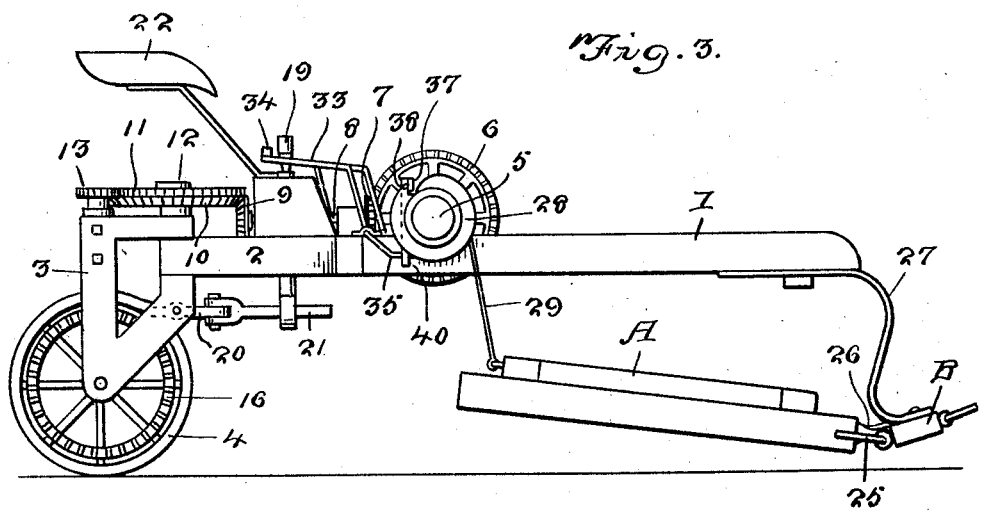

May 1, 1928. 1,668,400
J. A. FOLLMAN
POWER LIFT FOR HARROWS
Filed Feb. 5, 1927 4 Sheets-Sheet 3
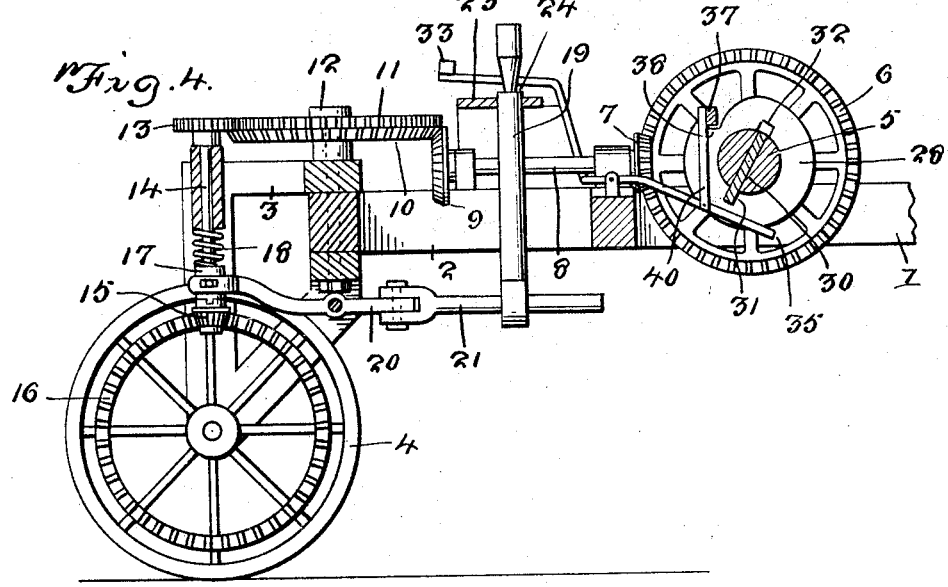
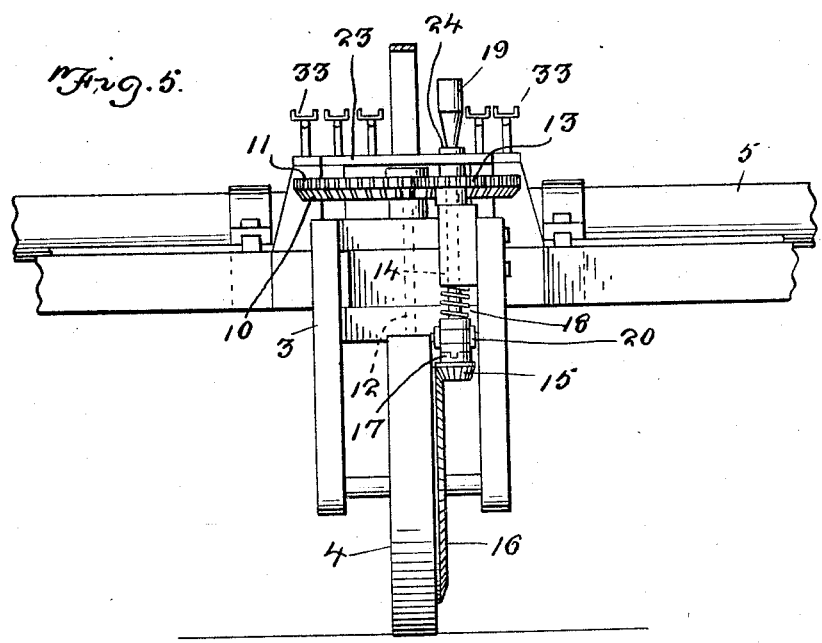
J. A. Follman
INVENTOR
BY Victor J. Evans
ATTORNEY May 1, 1928.
J. A. FOLLMAN
1,668,400
POWER LIFT FOR HARROWS
Filed Feb. 5, 1927
4 Sheets-Sheet 4
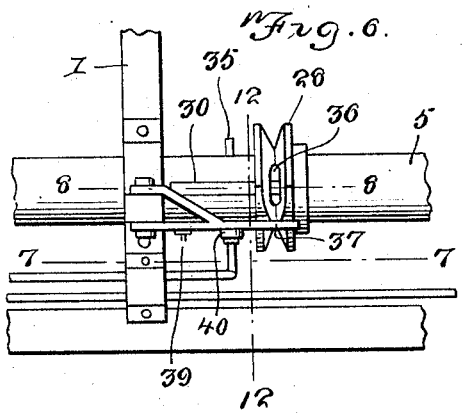
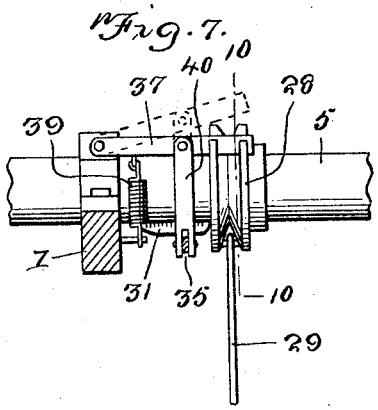
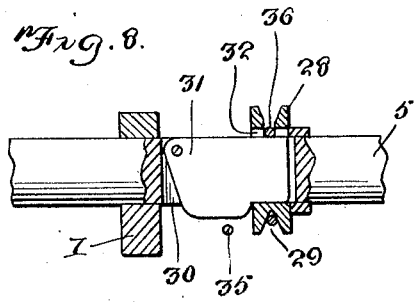
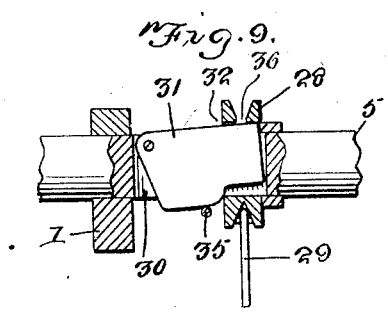
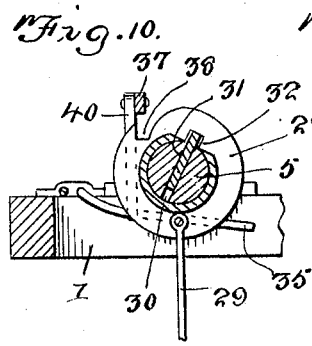
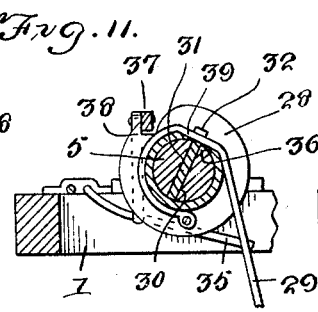
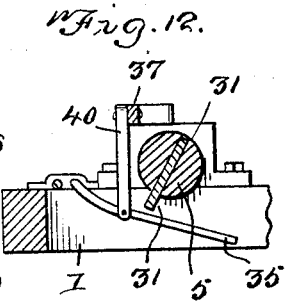
J. A. Follman
INVENTOR
BY Victor J. Evans
ATTORNEY Patented May 1, 1928.

1,668,400

UNITED STATES PATENT OFFICE.

JOHN ALBERT FOLLMAN, OF YORK, NORTH DAKOTA.

POWER LIFT FOR HARROWS.

Application filed February 5, 1927. Serial No. 166,197.

This invention relates to an agricultural implement, the general object of the invention being to provide a cart for a sectional harrow or drag, with power means for enabling the operator to lift any one of the sections whenever he desires so that the sections can be freed of trash and other matter collected by them as they travel over a field.

A further object of the invention is to provide means for taking the power from a ground wheel of the device and to provide clutch means for engaging the drive means with said ground wheel and for disengaging such means, as desired.

A still further object of the invention is to provide the ground wheel with a caster support so as to enable the implement to turn easily and to so arrange the driving connections between the wheel and the driven element that such connections will operate with the wheel in any position relative to the frame of the cart.

Another object of the invention is to make the driven element in the form of a shaft, with loosely arranged pulleys thereon, each pulley being connected wth a section of the drag or harrow by a cable, with foot operated means for holding each pulley stationary and for locking each pulley to the shaft, with means for enabling a cable to disengage its pulley from the shaft when a section is raised to its highest position, thus preventing a section from being raised too high.

A still further object of the invention is to provide flexible means for connecting the cart to the evener bar of the drag or harrow and resilient means for connecting the sections to the evener bar.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 2 is a view of one end of the apparatus.

Figure 3 is a similar view with a section in raised position.

Figure 4 is a section on line 4—4 of Figure 1.

Figure 5 is a rear view of the central portion of the apparatus.

Figure 6 is a plan view of a portion of the device showing one of the pulleys and the means associated therewith.

Figure 7 is a section on line 7—7 of Figure 6.

Figure 8 is a section on line 8—8 of Figure 6.

Figure 9 is a similar view but showing the dog in raised position.

Figure 10 is a section on line 10—10 of Figure 7.

Figure 11 is a similar view but showing the parts in a different position.

Fig. 12 is a section on line 12—12 of Figure 6.

Figure 1:
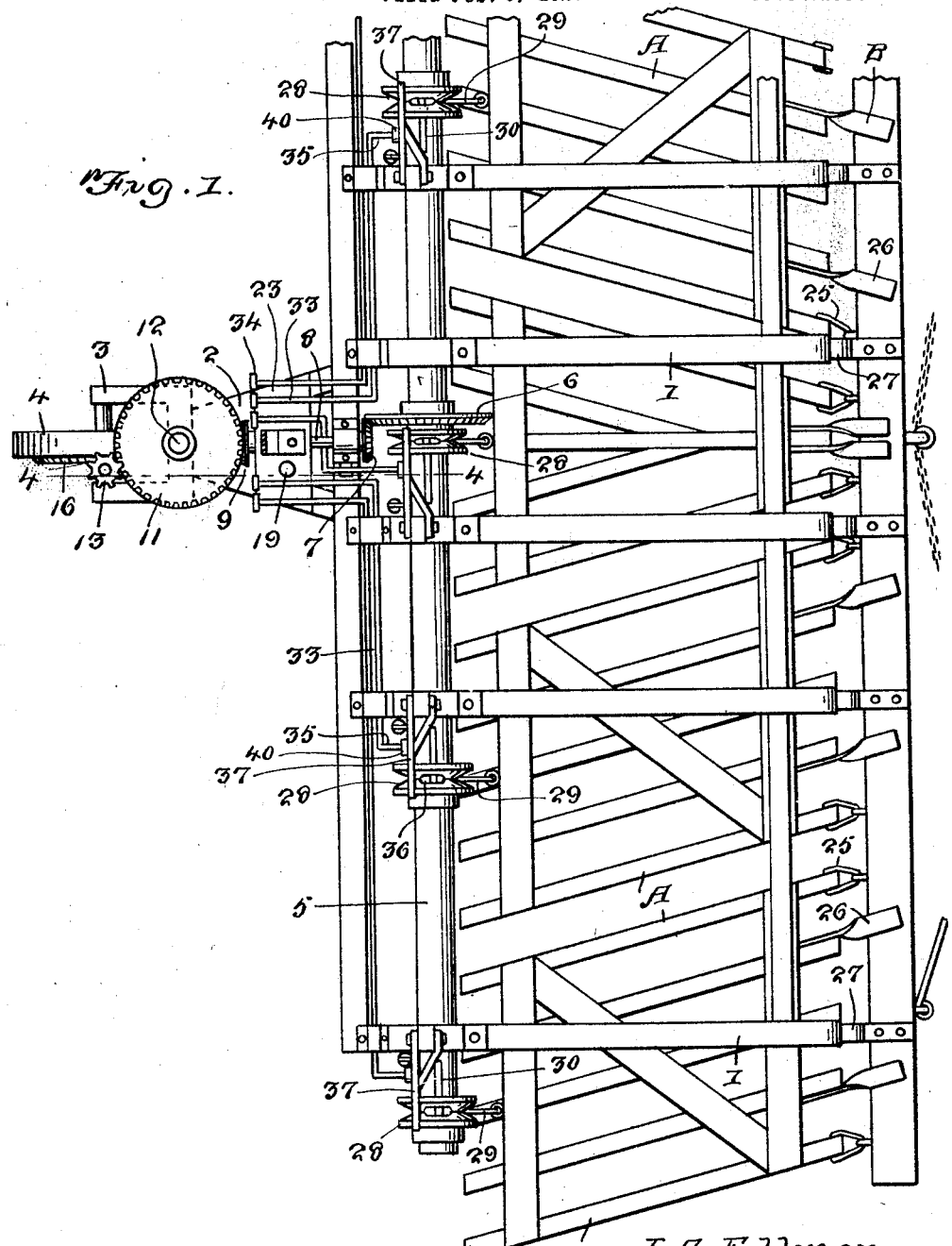
Figure 1 is a plan view of the invention, with parts broken away.

In these views, 1 indicates a frame which has a rear extension 2 at its center which is pivotally connected with the frame 3 which carries the caster wheel 4. A shaft 5 is journaled in the rear part of the frame 1 and a gear 6 is fastened to the shaft and is engaged by a pinion 7 carried by a shaft 8 which extends rearwardly over the frame 2 to which it is journaled and this shaft 8 carries a beveled pinion 9 which meshes with a beveled gear 10 formed on a gear wheel 11 which is pivoted on the king bolt 12 of the caster frame 3. The gear 11 is engaged by a pinion 13 fastened to a vertical shaft 14 which has a beveled pinion 15 loosely mounted at its lower end which meshes with a ring gear 16 on the ground wheel 4. A clutch 17 is normally held in engagement with the pinion 15 by a spring 18 so as to connect the pinion with the shaft 14, thereby enabling the shaft 5 to be driven from the ground wheel through the connections shown and by placing the gear 11 on the king bolt, it will be seen that said shaft 5 can be driven from the ground wheel no matter in what position the caster arrangement is in relative to the main frame 1.

The clutch 17 is shifted from a vertically arranged foot operated member 19 through a lever 20 pivoted to a part of the caster frame and having its forked end engaging the clutch 17 and a bar 21 which is pivotally connected with the front end of the lever 20 and passes through an eye in the lower end of the member 19. The upper end of the member 19 is arranged adjacent the operator's seat 22 carried by the extension 2 so that it can be easily manipulated by the foot of the operator.

A platform 23 is carried by the extension frame 2 and supports the seat and has a hole therein through which the member 19 passes. This member has an annular shoulder 24 thereon which will engage a part of the platform when the member is depressed and rocked slightly to hold the member in depressed position. The spring 18 of the clutch acts to hold the parts with the member in raised position. Thus the operator can engage and disengage the clutch by manipulating the member 19 with his foot.

The sectional drag or harrow is shown at A and the evener bar at B. The sections are hingedly connected with the bar, as shown at 25, and each section is also connected with the bar by the straps 26 which have a certain degree of resiliency. The front end of the main frame 1 is connected with the evener bar by the legs 27 which are composed of metal pieces having a certain degree of resiliency. The draft means (either animal or tractor) is connected to the evener bar in any desired manner.

A plurality of pulleys 28 is rotatably arranged on the shaft and a cable or chain 29 connects each pulley with a section of the harrow or drag. Each pulley is arranged over a slot 30 formed in the shaft 5 and a dog 31 is pivotally mounted in each slot and when lifted by means now to be described, will engage a notch 32 formed in the inner circumference of each pulley and thus lock the pulley to the shaft.

A plurality of pedal shafts 33 is mounted for rocking movement at the rear of the main frame, each shaft having its inner end formed with a pedal part 34 which is arranged in proximity to the seat 22 so that the driver can reach the same with his foot and the outer end of each shaft is formed with an arm 35 which is adapted to strike a pawl 31 when the shaft is rocked by the foot of the operator so as to raise the dog out of the slot 30 and cause it to engage the notch 32 in the pulley to lock the pulley to the shaft. This will cause the pulley to move with the shaft and thus the cable will be wrapped upon the pulley to lift the section to which said cable is connected. After the pulley has almost made one revolution, an opening 36, made in the pulley, will come to the top so that a portion of the cable will enter said opening and thus engage the dog and push the dog back into the slot and out of the notch 32. This will free the pulley so that the weight of the section will cause the pulley to rotate on the shaft back to its first position which will permit the section to drop back on the ground.

In order to hold the sections raised as long as desired, I provide locking means for holding each pulley in a position with the cable wrapped thereon and the section in raised position. Such locking means comprises a latch member 37 adapted to engage a notch 38 formed in each pulley through means of a spring 39 which is attached to the latch member. This member is connected by a link 40 with the arm 35 of each pedal shaft so that as the shaft is rocked to raise the arm 35 to move the dog 31, the latch member 37 will be raised out of the notch 38 and thus unlock the pulley so that it can be moved with the shaft by the dog 31. Just as the cable disengages the dog from the notch 32, the notch 38 will come under the latch bar 37 so that its spring 39 will pull the latch bar into the notch and thus lock the pulley against turning movement. This will hold the pulley with the section raised even though the dog has been moved out of the notch. Then when the operator wishes to drop the section, he simply steps on the pedal of that shaft which is associated with the raised section so as to lift the latch 37 out of the notch 38 and then the weight of the section will cause the pulley to revolve back to its original position as the section drops back upon the ground.

From the foregoing it will be seen that I have provided means for raising any desired section of a drag or harrow through means operated from the ground wheel and controlled by the operator so that the operator can free any of the sections of trash and the like collected as the harrow or drag passes over a field. As soon as the section reaches a certain position, the pulley is automatically released from the shaft and is locked with the section in raised position. Thus there is no danger of the parts being damaged by the pulley being rotated too far. Then the operator, by depressing the pedal of the shaft which is associated with the raised section, can drop the section. This invention will enable the operator, with but little effort, to keep the sections clean so that the implement will work with the maximum efficiency. Whenever desired, the operator can disconnect the shaft 5 from the ground wheel, though said shaft can be kept in rotation even when the device is turned, owing to the arrangement of the driving connection between the ground wheel and said shaft.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A cart for a sectional implement comprising a frame, a caster wheel assembly at the rear thereof, means for attaching the front of the cart to the implement, a shaft rotatably mounted on the frame, means for rotating the same from the wheel, pulleys loosely mounted on the shaft, a cable connecting each section to a pulley, dogs carried by the shaft, and each pulley having a notch for receiving a dog so that the dog will lock the pulley to the shaft and each pulley having an opening therein for permitting the cable to engage the dog when the pulley has been moved a certain distance to raise its section so that the dog will be automatically released from the pulley by the cable to permit the section to drop.

2. A cart for a sectional implement comprising a wheeled frame, a shaft rotatably mounted on the frame, means for rotating the same, pulleys loosely mounted on the shaft, a cable connecting each section to a pulley, dogs carried by the shaft, and each pulley having a notch for receiving a dog so that the dog will lock the pulley to the shaft and each pulley having an opening therein for permitting the cable to engage the dog when the pulley has been moved a certain distance to raise its section so that the dog will be automatically released from the pulley by the cable to permit the section to drop and latch means for holding each pulley with its cable in wound up condition thereon with the section raised.

3. A cart for a sectional implement comprising a wheeled frame, a shaft rotatably mounted on the frame, means for rotating the same, pulleys loosely mounted on the shaft, a cable connecting each section to a pulley, dogs carried by the shaft, and each pulley having a notch for receiving a dog so that the dog will lock the pulley to the shaft and each pulley having an opening therein for permitting the cable to engage the dog when the pulley has been moved a certain distance to raise its section so that the dog will be automatically released from the pulley by the cable to permit the section to drop, latch means for holding each pulley with its cable in wound up condition thereon with the section raised, and means for releasing the latch means.

4. A cart for a sectional implement comprising a wheeled frame, a shaft rotatably mounted on the frame, means for rotating the same, pulleys loosely mounted on the shaft, a cable connecting each section to a pulley, dogs carried by the shaft, and each pulley having a notch for receiving a dog so that the dog will lock the pulley to the shaft and each pulley having an opening therein for permitting the cable to engage the dog when the pulley has been moved a certain distance to raise its section so that the dog will be automatically released from the pulley by the cable to permit the section to drop, latch means for holding each pulley with its cable in wound up condition thereon with the section raised, and means for releasing the latch means by the before mentioned manually operated means.

5. A cart for a sectional implement comprising a wheeled frame, a shaft rotatably mounted on the frame, means for rotating the shaft from the wheel of the frame, pulleys loosely mounted on the shaft, a cable connecting each pulley with a section of the implement, the shaft having slots therein, one adjacent each pulley, a dog pivoted in each slot and each pulley having an interior notch for receiving its dog, manually operated mean for moving each dog into engagement with its pulley, each pulley having an opening therein opposing the dog when the pulley has been moved to wind up the cable for causing the cable to move the dog to releasing position, a spring latch for holding each pulley in either one of its two limits of movement and means for connecting each latch to the manually operated dog actuating means so that such means will operate the latch.

6. A cart for a sectional implement comprising a wheeled frame, a shaft rotatably mounted thereon, means for rotating the shaft from the wheel of the cart, pulleys loosely mounted on the shaft, a cable connecting each pulley with a section, the shaft having slots therein arranged adjacent the pulleys and each pulley having a notch therein, a dog pivoted in the slot and adapted to engage the notch in the pulley to lock the pulley to the shaft and each pulley having an opening therein which will permit the cable to move the dog to releasing position when the pulley has been moved a certain distance to raise its section, a latch for each pulley, each pulley having a second notch therein for receiving the latch, a manually operated rock shaft for each pulley, each lock shaft having an arm on its outer end for engaging the dog of each pulley to move the dog into engagement with the notch of the pulley and a link connecting the arm with the latch for transmitting the movement of the arm of the shaft to the latch.

7. A cart for a sectional implement comprising a frame, a caster wheel assembly at the rear of the frame, means for connecting the front of the frame with the implement, a shaft on the frame, means for transmitting the movement of the caster wheel to the shaft, including clutch means, manually operated means for actuating the clutch means to operatively connect and disconnect the shaft from the wheel, pulleys loosely arranged on the shaft, a cable connecting each pulley with a section of the implement, a dog for connecting each pulley with the shaft, automatic means for moving each dog to releasing position when the section is raised to a certain position, a latch for holding each pulley at each limit of its movement, a plurality of rock shafts carried by the frame, a pedal connected with the inner end of each shaft, an arm at the outer end of each shaft, each arm acting to move a dog in locking engagement with a pulley when its respective rock shaft is actuated and a link connecting each arm with a latch to move the latch into releasing position when its respective rock shaft is actuated.

In testimony whereof I affix my signature.

JOHN ALBERT FOLLMAN.